United States Patent [19]

Yamada et al.

[11] Patent Number: 4,759,780
[45] Date of Patent: Jul. 26, 1988

[54] APPARATUS FOR CONCENTRATING A GAS, ESPECIALLY OXYGEN, FROM A GASEOUS MIXTURE USING AN ULTRATHIN SOLID MEMBRANE

[75] Inventors: Takeyoshi Yamada; Shizuka Kurisu; Shizuo Azuma; Kiyoshi Sugie; Teizo Yamaji, all of Iwakuni, Japan

[73] Assignee: Teijin Limited, Osaka, Japan

[21] Appl. No.: 498,154

[22] Filed: May 25, 1983

Related U.S. Application Data

[62] Division of Ser. No. 217,582, Dec. 18, 1980, Pat. No. 4,406,673.

[30] Foreign Application Priority Data

Dec. 27, 1979 [JP] Japan .................. 54-169461
Jun. 2, 1980 [JP] Japan .................. 55-72678
Jul. 14, 1980 [JP] Japan .................. 55-95057
Nov. 6, 1980 [JP] Japan .................. 55-155198
Nov. 6, 1980 [JP] Japan .................. 55-155197

[51] Int. Cl.$^4$ .................................... B01D 13/00
[52] U.S. Cl. .................................... 55/158; 210/346
[58] Field of Search .................. 55/16, 158; 210/346, 210/321.1, 433.2

[56] References Cited

U.S. PATENT DOCUMENTS

| | | | |
|---|---|---|---|
| 3,551,244 | 12/1970 | Forester et al. | 156/246 |
| 3,615,024 | 10/1971 | Michaels | 210/490 |
| 3,950,247 | 4/1976 | Chiang et al. | 210/23 R |
| 3,976,451 | 8/1976 | Blackmer et al. | 55/158 |
| 4,132,824 | 1/1979 | Kimura et al. | 55/158 |
| 4,174,955 | 11/1979 | Blackmer | 55/158 |
| 4,197,148 | 4/1980 | Shinomura | 156/79 |
| 4,349,440 | 9/1982 | Esmond | 55/158 X |

*Primary Examiner*—Frank Spear
*Attorney, Agent, or Firm*—Sherman and Shalloway

[57] ABSTRACT

A module comprising a plurality of members for obtaining a gas having a specified gas concentrated therein from a mixture of at least two gases, each of said members comprising (a) a solid support plate and (b) a composite film comprised of a porous sheet-like material and one or a plurality of ultrathin solid membranes supported on the porous sheet-like material with a thickness of about 50 to about 5000 Å. This module is characterized in that (1) each of said members has a first gas drawing port for drawing off the gas having a specified gas concentrated therein, and the pressure drop in a passage for the concentrated gas in the members is not more than about 2 mmHg per cm in a direction away from the first gas drawing port, (2) the module has a common feed port for feeding the mixture of at least two gases to the solid membrane surface of each members, a second drawing port connected to the first gas drawing port of each of said members, and a third common drawing port for drawing off the remaining gases formed as a result of concentration by each of the members, and (3) in each of the members, the flow of the gaseous mixture is countercurrent, or angularly displaced, to the flowing direction of the concentrated gas.

An oxygen enricher having the module is useful for obtaining an oxygen-enriched gas from air.

7 Claims, 2 Drawing Sheets

APPARATUS FOR CONCENTRATING A GAS, ESPECIALLY OXYGEN, FROM A GASEOUS MIXTURE USING AN ULTRATHIN SOLID MEMBRANE

This is a divisional application of our prior application Ser. No. 217,582 filed Dec. 18, 1980, now U.S. Pat. No. 4,406,673, issued Sept. 27, 1983.

This invention relates to a module having an ultrathin solid membrane for concentrating a specified gas such as oxygen gas in a gaseous mixture such as air and an oxygen enricher using the module.

For some years, there has been a marked advance in membrane-dependent separation techniques in various fields. A technique for separating a gaseous mixture using a membrane, however, is a relatively recent technological development. The technical difficulty of separating a specified gas from a gaseous mixture lies in the development of a material capable of permitting permeation of the specified gas with sufficient selectivity and at a sufficient permeating speed and also in the establishment of a technique for forming such a material into a very thin membrane having a uniform thickness and a large area.

Generally, the amount of a gas permeating a homogeneous membrane is defined by the following equation.

$$X = \frac{P \times (P_1 - P_2) \times A}{l}$$

wherein
X represents the permeating velocity [cc(STP)/sec.] of the gas,
P is the permeation coefficient [cc(STP)x·cm/cm$^2$·cmHg·sec] of the gas,
$(P_1-P_2)$ is the difference of the partial pressures (cmHg) of the gas on both surfaces of the membrane,
A represents the area (cm$^2$) of the membrane, and
l is the thickness (cm) of the membrane.

It is clear therefore that once the material of which the membrane is made and a gas to be permeated are specified, the amount of permeation of the gas depends upon the thickness and area of the membrane. It is desired to make the membrane thickness as small as possible and the area of the membrane as large as possible.

As a prior attempt to produce a membrane having a small thickness and a large area, there is known a process for producing an ultrathin membrane by a batchwise technique, which comprises dropping a solution of a blend of a methylpentene polymer and an organopolysiloxane-polycarbonate copolymer in a solvent onto the surface of water to allow the solution to spread spontaneously on the surface of water (see U.S. Pat. No. 4,192,842). As described in the specification of this Patent, the use of the organopolysiloxane-polycarbonate copolymer makes it possible for the solution to spread spontaneously on the surface of water. The specification of this U.S. Patent also describes a method involving the use of a solution of the methylpentene polymer alone in a solvent. Investigations of the present inventors, however, have shown that the method using such a solution which does not contain the organopolysiloxane-polycarbonate copolymer did not lead to the successful production of an ultrathin membrane having a uniform thickness and a large area. Thus, although the method disclosed in the above cited U.S. Pat. No. 4,142,842 involving the use of a solvent solution of the methylpentene polymer alone is one attempt at the production of an ultrathin membrane, it is at least not easy to produce an ultrathin membrane having a uniform thickness and a broad area suitable for practical application.

U.S. Pat. No. 4,132,824 from which the above-cited U.S. Pat. No. 4,192,842 was divided out claims only an ultrathin membrane comprising a blend of a methylpentene polymer and an organopolysiloxane-polycarbonate copolymer.

U.S. Pat. No. 4,155,793 discloses a process for continuously producing a composite laminar membrane consisting of a web and two thin polymeric films held thereon in the superimposed state, which comprises feeding solvent solutions of polymer into two wells provided in opposing directions on the surface of an aqueous medium to spread the solvent solutions of the surface of the aqueous medium, and continuously feeding a web coming into the aqueous medium at a position intermediate between the two wells thereby to hold on the web two thin films formed from the solvent solutions spread on the water surface. This process is characteristic in that two thin films are continuously formed on a stationary aqueous medium, and these two films are simultaneously held on one web and continuously recovered from the surface of the stationary aqueous medium.

The ultrathin film produced by such a process is used generally for producing an oxygen-enriched gaseous mixture from air, as is disclosed in the specification of the above-cited U.S. Patent. Such a use is embodied as a device for obtaining an oxygen-enriched gas from air in the specifications of U.S. Pat. Nos. 3,976,451 and 4,174,955.

It is an object of this invention to provide a module used to concentrate a certain gas by using a solid membrane having a uniform thickness and the desired gas separation factor. Another object of this invention is to provide an oxygen enricher comprising the aforesaid module for producing an oxygen-enriched gas from the air.

Other objects and advantages of this invention are apparent from the following description and accompanying drawings.

Figure 2:
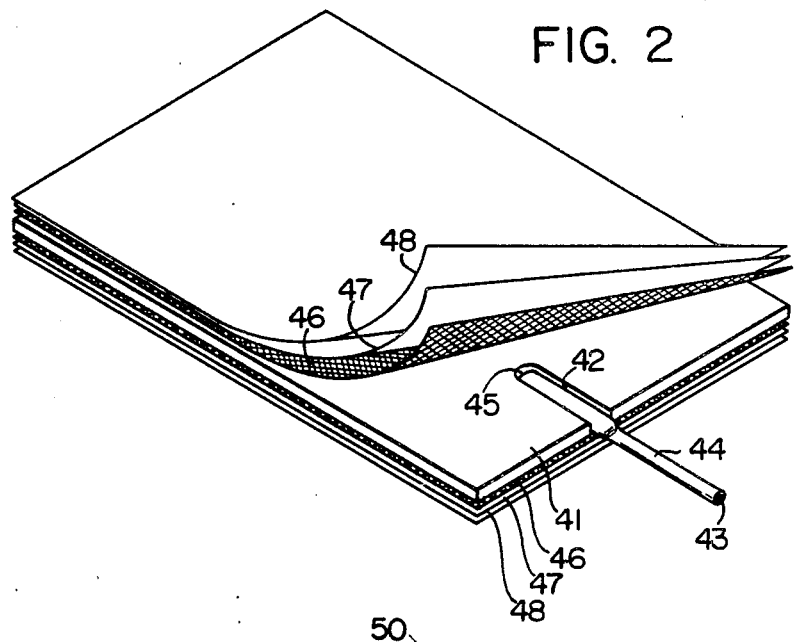
FIG. 2 shows a schematic perspective view of a single solid membrane gas separation member.

According to this invention, these objects and advantages are achieved by a module which comprises a plurality of members for obtaining a gas having a specified gas concentrated therein from a mixture of at least two gases, each of said members comprising (a) a solid support plate and (b) a composite film comprised of a porous sheet-like material and one or a plurality of ultrathin solid membranes supported on the porous sheet-like material with a thickness of about 50 to about 5000 Å, said ultrathin solid membranes being an addition polymer derived from at least one monomer selected from the group consisting of ethylenically unsaturated hydrocarbon monomers and conjugated unsaturated hydrocarbon monomers, and said composite film being laminated to one or both surfaces of the solid support plate so that the porous sheet-like material of the composite film faces the solid support plate; characterized in that (1) each of said members has a first gas drawing port for drawing off the gas having a specified gas concentrated therein, and the pressure drop in a passage for the concentrated gas in the members is not more than about 2 mmHg per cm in a direction away from the first gas drawing port, (2) the module has a common feed port for feeding the mixture of at least two gases to the solid membrane surface of each members, a second drawing port connected to the first gas drawing port of each of said members, and a third common drawing port for drawing off the remaining gases formed as a result of concentration by each of the members, and (3) in each of the members, the flow of the gaseous mixture is countercurrent, or angularly displaced, to the flowing direction of the concentrated gas.

The critical feature of the module of this invention is that it has the second common gas drawing port connected to the first gas drawing port of each of the members for drawing the concentrated gas, and the pressure drop for the concentrated gas in each of the members is not more than about 2 mmHg per cm in a direction away from the first gas drawing port. The module of this construction is compact and light and has excellent separating efficiency.

In the members of this invention, the solid support plate can be effectively used by placing the solid membrane (composite film) on its surfaces. This means that the membrane area per member can be maximized. In other words, if the area of the solid membrane required for gas permeation is constant, the number of members can be minimized, and a compact and light-weight module can be built.

The solid support in the module of this invention has the dual function of stabilizing the form of the members to support the solid membrane and of forming a passage for a concentrated gas which has permeated through the solid membrane. If the gas has difficulty flowing through the passage, the pressure drop increases, and therefore, the difference between the pressures exerted on both surfaces of the solid membrane is small. Hence, the amount of the gas permeated decreases proportionally to such a difference in pressure.

It is known that separation of a gaseous mixture becomes better (the gas separating ability is better) as the ratio of the pressures exerted on both surfaces of the solid membrane (the ratio of the pressure on the higher pressure side to the pressure on the lower pressure side) increases. Accordingly, when the pressure drop in the passage is high, the pressure on the lower pressure side increases and the ratio of the pressures decreases. Consequently, the concentration of the desired gas in the concentrated gas obtained after permeation through the solid membrane decreases.

For this reason, the solid support plate is suitably of a structure which minimizes hampering of the passage for the concentrated gas which has permeated through the solid membrane, namely a structure which minimizes the pressure drop. A solid support plate in which the pressure drop is not more than about 2 mmHg, preferably not more than about 1.5 mmHg, more preferably not more than about 1 mmHg, per cm is preferred.

The pressure drop is measured in this invention in the following manner.

A sample having a length of 50 cm and a width of 25 cm is cut out from the member, and the entire surface of the sample is covered with a gas-barrier film. Both 50 cm-long ends of the sample are sealed gas-tight. To both 25 cm-long ends is connected a thick tubular flow opening through which a gas flows without resistance, for example a tube having an inside diameter of about 8 mm. One end of the tube is kept open and adapted for decreasing the opening area, and vacuum suction is effected from the other opening of the tube. When the flow rate of air is 1 liter/min. on the suction side, the pressures at both openings are measured, and the difference between them is defined as the pressure drop. The measurement is made at 25° C.

The solid support plate in the module of this invention is preferably a metal plate such as an aluminum plate, a Duralmin (tradename) plate, a plastic plate such as a polypropylene, hard vinyl chloride resin, fiber-reinforced polyethylene terephthalate or unsaturated polyester plate, or a net-like article such as a stainless steel net or porous polypropylene plate. A spacer is preferably used which forms a sufficient passage for a concentrated gas between the solid support and the composite film. Various kinds of nets, nonwoven fabrics, porous materials, etc. are used as the spacer. A member containing such a spacer can be built by laminating the net, nonwoven fabric, etc. either alone or in combination on one or both surfaces of the solid support plate, and further laminating the composite film of this invention onto the spacer. It is necessary in this case to laminate these materials such that the pressure drop in each member is within the above-specified range.

The spacer has an action of rendering the flow of a gas through the member easy when the net-like article is not used as the solid support plate, and its selection is especially important. The net preferably has coarse meshes and a raised-and-depressed pattern. It may be made of a plastic or metal, and plastic nets are preferred from the viewpoint of light weight. The plastic nets preferably have stiffness, and for this purpose, such materials as polypropylene, polyethylene terephthalate and polyamides may be used. Examples of commercially available nets are Vexor of Du Pont, Netlon of Tokyo Polymer Co., Ltd., and Nip nets of N.B.C. Industrial Co.

The nonwoven fabrics may be made from polyethylene terephthalate, polypropylene, polyethylene, polyamides, etc. For example, Unicell R Type of Teijin Limited, and MF Type of Japan Vilene are commercially available.

A preferred laminated structure in the member of the module of this invention consists of a metal plate, a net-like material on both surfaces of the metal plate, a non-woven fabric on both surfaces of the net-like material and a composite film laminated to the surfaces of the nonwoven fabric so that the porous sheet-like material contacts the non-woven fabric. A member of this structure shows an especially small pressure drop, has good durability and prevents deformation of the solid membrane. In particular, the use of the non-woven fabric is advantageous in avoiding rupture of the solid membrane which may occur in the absence of a nonwoven fabric as a result of deformation of the solid membrane along the profile of the net-like material (generally having coarse meshes and an uneven surface). The nonwoven fabric also has an action of making the flow of a gas easy. Accordingly, it is preferred that the nonwoven fabric should have a smooth surface and a smaller mesh opening size than the mesh opening size of the net-like material.

To make the entire module compact, the thickness of the member should preferably be as small as possible. It is generally not more than 5 mm, preferably not more than 4 mm, more preferably not more than 3 mm.

As stated hereinabove, the member used in this invention has the composite film on one or both surfaces of one solid support plate. A first gas drawing port is provided in this member in order to draw the concentrated gas obtained after permeation through the composite film. The first drawing port should have a cross-sectional area and a length which scarcely permit a pressure drop therein. The member having one drawing port for the two solid membranes is characterized by the fact that the number of drawing ports can be reduced to one-half as compared with a member having two drawing ports for two solid membranes, and the number of assembling pipes for assembling the concentrated gas from the drawing ports can be decreased, thus imparting a simple and convenient structure to the member and the module.

Excepting the drawing port, the entire periphery of the member is sealed up gas-tight. In other words, it is necessary to provide a structure which does not permit mixing of a feed gas and the concentrated gas which has permeated through the solid membrane. To provide such a structure adhesives are preferably used. Examples of preferred adhesives are epoxy resins, and an ionomer resin (Sarlin A ®) formed into a film. When an adhesive in a film form (for instance, Sarlin A ® film) is used, uniform thickness and good gas-tightness can be achieved.

A plurality of members so produced are built into an array of the stacked members so as to prevent contact of the solid membranes with each other and also to provide a passage through which a gas flows along the outside surface of the solid membrane. The interval between the members is at least 1 mm, preferably at least 2 mm. A preferred array for the production of the module of this invention is the one in which the members at two opposite ends of the array are composed of a solid support plate and the composite film laminated only to its one surface so as to avoid exposure of the solid membrane surfaces.

Spacers of any material are used between the members in building the array. From the viewpoint of the light weight of the module or the firmness of the members, the spacers are preferably made of a rubber or a plastic. It is sufficient that the spacers are located at the peripheral edges of the members, and are fixed to the member by, for example, an adhesive.

The array so built is then placed into a box capable of receiving it to provide the module of this invention. In the array within the box, the first gas drawing ports from the individual members are connected to a single assembling pipe. One end portion of the assembling pipe is drawn from the box to form a second gas drawing port from which the concentrated gas is drawn off.

The box further includes a common feed port for feeding a gas to be concentrated from outside the box, and a third common drawing port for drawing the gas remaining after drawing off the concentrated gas.

The gas to be concentrated which has been fed into the box from the common feed port is concentrated through the solid membranes of the members while it flows through the passages between the member, thereby giving a concentrated gas (which is drawn out of the box through the second common drawing port) to the inside of the solid membrane, and is discharged as the remaining gas out of the box through the third common drawing port.

Figure 1:
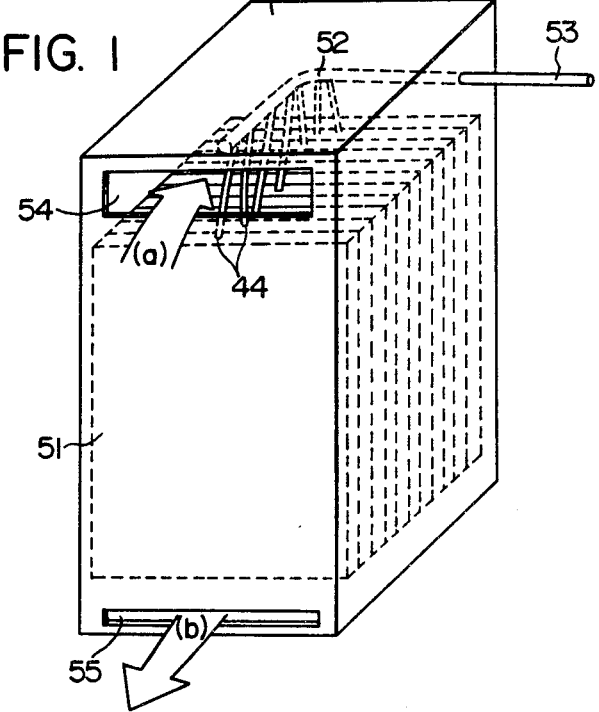
FIG. 1 shows a schematic perspective view of the module of this invention including an array of solid membrane gas separation members.

The gas to be concentrated which is flowing through the passages between the members of the array forms a flow which is countercurrent (for example, as shown in FIG. 1, the gas to be concentrated is introduced into the passage between the members from the direction of the first gas drawing port), or is angularly displaced (i.e., not concurrent), to the flowing direction of the concentrated gas given to the inside of the solid membrane. By forming such a flow, the module of this invention has an improved separating efficiency.

The module of this invention is advantageously used when a gas to be concentrated is fed at atmospheric pressure from the common feed port, and the second common drawing port from which the concentrated gas is drawn off is connected to a pressure reduction system to reduce the pressure of the passage for the concentrated gas. Such a module is light in weight and compact.

When, for example, oxygen-enriched air is produced from atmospheric air, the amount of the air to be fed to the module is usually at least 5 times, preferably at least 10 times, more preferably at least 30 times, the amount of oxygen-enriched air drawn from the module.

An apparatus for actually obtaining oxygen-enriched air from the atmospheric air using the module of this invention is embodied by an oxygen enricher.

The present invention also provides an oxygen enricher for obtaining an oxygen-enriched gas from air comprising a module including a plurality of members for obtaining the oxygen-enriched gas from the air, an air take-in port for feeding the air into the module, an air exhaust port for drawing a gas of a reduced oxygen concentration from the module, a vacuum pump for reducing the pressure of the passage for the oxygen-enriched gas in the members and drawing the oxygen-enriched gas, a cooling and water-removing means for lowering the temperature of the oxygen-enriched gas from the vacuum pump and removing water therefrom, and a housing; characterized in that (1) the module is the module of the present invention, (2) a fan is provided in front of the air take-in port of the module for feeding air into the module and drawing off a gas having a reduced oxygen concentration from the module, (3) said vacuum pump is adapted to be cooled by the gas having a reduced oxygen concentration which has left the module, and (4) a passage is provided through which the oxygen-enriched gas from the vaccum pump flows while it is cooled fully by the cooling and water-removing means cooled by the air taken into the oxygen enricher from the air take-in port and the cooled oxygen-enriched gas is then drawn out of the oxygen enricher without heat exchange with the gas having a reduced oxyen concentration which has cooled the vacuum pump.

The oxygen-enriched air (gas) obtained by the oxygen enricher of this invention can be used therapeutically for patients with diseases of the respiratory system such as asthma, emphysema and chronic bronchitis, and for industrial applications in small-size combustion furnaces and aquaculture. The oxygen enricher of this invention is characterized by being light in weight and compact, producing little noise, and being able to produce oxygen-enriched air having a small temperature difference from the temperature of the atmospheric air and having an oxygen concentration of not more than 50%. Accordingly, the oxygen-enriched air obtained from the oxygen enricher of this invention is especially recommended for use in medical therapy.

Inhalation of oxygen-enriched air having an oxygen concentration of more than 60% is known to cause pneumonic ailments or nervous disorders rather than to perform therapy. It is also known that oxygen-enriched air having a large temperature difference from the temperature of the atmospheric air gives an unpleasant feeling to patients. Evidently, a heavy, bulky and noise-making device is inappropriate.

The oxygen enricher of this invention, as mentioned above, has incorporated therein the module of this invention and further comprises a fan provided in front of the common feed port of the module, a vacuum pump connected to the second common drawing port of the module, cooling and water-removing means, an intake-port for the atmospheric air, an opening for discharging the air, and a housing having these members provided therein.

Incorporation of the module into the oxygen enricher can be achieved not only by setting the module of this invention therein, but also by providing the aforesaid array before the building of the module of this invention in a preselected area in the oxygen enricher. The oxygen enricher of this invention includes those in which the module has been incorporated by any of these methods.

The fan takes the air from the air take-in opening, supplies it to the module and discharges it from the discharge opening.

The vacuum pump reduces the pressure of the passages for the oxygen-enriched air in the module and takes out the oxygen-enriched air out of the oxygen enricher so that concentration is effected with good efficiency through the solid membranes.

In the oxygen enricher, the gas having a reduced oxygen concentration as a result of going through the module is discharged from the air discharging opening after it has cooled the vacuum pump. Before the oxygen-enriched air from the vacuum pump is taken out of the oxygen enricher, it is cooled with the atmospheric air taken into the oxygen enricher from the air take-in opening and the water is removed therefrom. The cooling and water-removing means may, for example, be a hose through which oxygen-enriched air can flow. The cooled oxygen-enriched air is taken out of the oxygen enricher without heat exchange with the hot gas to be discharged which has cooled the vacuum pump.

The fan used in this invention should be capable of supplying the atmospheric air into the module in an amount at least 5 times, preferably at least 10 times, more preferably at least 30 times, the amount of oxygen-enriched air to be drawn off from the module. A suitable example of the vacuum pump is the one which does not permit inclusion of fine particles such as oils because the resulting oxygen-enriched air is used for human inhalation. A preferred vacuum pump is of oilless type with suppressed noise and good durability. The ability of the pump varies greatly depending upon the amount of enriched air, the concentration of oxygen, and the performance of the separating membrane. For example, when it is desired to obtain oxygen-enriched air having an oxygen concentration of at least 35% at 6 liters/min. for therapeutic purposes, and the ratio of the oxygen permeation coefficient to nitrogen permeation coefficient of the solid membrane is 3.5, the pump is required to have such a performance as can secure a flow rate of 6 liters/min. at an absolute pressure of 270 mmHg. For use in therapeutic oxygen enrichers, oilless pumps of the diaphragm type made by Gast Corp. and Thomas Corp. of U.S.A. and Iwai Kabushiki Kaisha of Japan, for example, are used preferably.

The gas to be discharged from the module can be utilized for the cooling of the vacuum pump in operation. Preferably, the cooled gas is discharged out of the oxygen enricher through an air duct having at least one winding portion in order to prevent leakage of the pump noises from the oxygen enricher. It is also preferred to apply a sound absorbing material, etc. to the wall of the housing around the pump.

A heat exchanger such as a hose is used as the cooling and water-separating means. In order to cool the oxygen-enriched air with good efficiency by the atmospheric air to a point near the temperature of the atmospheric air through the heat exchanger, it is preferred to provide the heat exchanger immediately near the air take-in opening. Care should be taken so that the surrounding of the heat exchanger is not warmed by the heat of the vacuum pump.

From the standpoint of heat conduction, the heat exchanger is preferably made of a metallic material. A copper material is especially preferred because it also has an antibacterial effect. The heat exchanger may be of any of ordinary types. A preferred type is the one which is compact and permits flowing of water therethrough. Accordingly, a coil-like heat exchanger is preferred. The length of the heat exchanger differs depending upon the amount and temperature of the enriched air. In some case, the length of the coil is desirably more than 1 meter.

The water-separating means serves to separate the water from the enriched air. The simplest means is to introduce water-containing enriched air from a side portion of a cylindrical tube, and separating the air upwardly and the moisture downwardly. To improve the separating efficiency, a packing such as a Raschig ring may be put into the cylindrical tube, and it is also possible to provide an obstacle such as a shelf therein. The water which gathers in the lower portion of the water separator is discharged out of it. The manner of discharging is not particularly restricted. For example, a receiver tray is provided to pool the water therein. Or the water is caused to be absorbed by a material capable of well absorbing water, such as a gauze, and then is evaporated. In the latter case, water can be evaporated efficiently by using the exhaust gas which has been used to cool the pump.

If required, the oxygen enricher may also include a column packed with activated carbon or the like for removing noxious gases such as $NO_x$ and $SO_x$ and offensive odors from the enriched air, or a biofilter for removing bacteria from the enriched air. This is also effective for preventing bacterial contamination in the conduit portion for enriched air when the oxygen enricher is out of operation. The oxygen enricher may also include accessory parts such as alarms for detecting and warning an abnormal condition during the operation, timers, flow meters, manometers, etc.

The ultrathin solid membrane itself constituting the module of this invention and the composite film comprised of a porous sheet-like material and one or a plurality of ultrathin solid membranes supported on the porous sheet-like material can be produced in accordance with the same methods as described in the specification and drawings of U.S. patent application Ser. No. 217,582 filed on Dec. 18, 1980, now U.S. Pat. No. 4,406,673 issued Sept. 27, 1983, which is the parent application of the present application. Accordingly, a detailed description of these manufacturing methods is omitted in the present application, and they are only briefly stated herein.

As described in claim 1 of the U.S. Pat. No. 4,406,673 the ultrathin solid membrane which constitutes a principal part of the module of this invention can be produced by a process which comprises dissolving an addition polymer derived from at least one monomer having from 2 to 20 carbon atoms and selected from the group consisting of ethylenically unsaturated hydrocarbon monomers and conjugated unsaturated hydrocarbon monomers in a solvent composed mainly of volatile, substantially water-immiscible organic liquid medium capable of dissolving the addition polymer and being selected from the group consisting of a hydrocarbon and a halogenated hydrocarbon, said solvent containing 0.1 to 15% by weight of another organic compound selected from the group consisting of alicyclic alcohols, aromatic alcohols, ketones, aldehydes, carboxylic acids, peroxides, and mixtures thereof, said organic compound having a distribution coefficient k, which is the ratio of the concentration of the other organic compound in the organic liquid medium to that in water, of from 0.5 to 35, and said solvent meeting the following equation $$c_1 - (a_1 + b_1) \geq 25$$

wherein $c_1$ is the surface tension (dynes/cm) of water, $a_1$ is the surface tension (dynes/cm) of the solution of the addition polymer in the solvent, and $b_1$ is the interfacial tension (dynes/cm) between the solvent solution and water, and thereafter allowing the solvent solution of the addition polymer to spread spontaneously on the surface of a liquid support consisting substantially of water whereby the solvent in the solvent solution is removed to an amount sufficient to form a solid membrane on the surface of the liquid support.

The addition polymer forming the ultrathin film is, as stated hereinabove, derived from at least one monomer having from 2 to 20 carbon atoms and selected from the group consisting of ethylenically unsaturated hydrocarbon monomers and conjugated unsaturated hydrocarbon monomers.

Preferably, it is an aliphatic or cycloaliphatic compound having 2 to 20 carbon atoms, especially 4 to 10 carbon atoms. Examples of the hydrocarbon monomer are ethylenically unsaturated hydrocarbon monomers such as ethylene, propylene, butene, isobutene, pentene, methylpentene, hexene, methylhexene, heptene, cyclohexylpentene, styrene, α-methylstyrene, and mixtures of these; and conjugated unsaturated hydrocarbon monomers such as butadiene, isoprene, cyclooctadiene and mixtures of these.

Processes for producing addition polymers from these monomers are known to those skilled in the art.

The addition polymer used in the process of this invention may be a homopolymer or copolymer of such a monomer. The copolymer may be a random, garaft or block copolymer. The homopolymer is preferred. Examples of the homopolymer include polyethylene, polypropylene, polybutene, polyisobutene, polyheptene, polymethylpentene, polyhexene, polymethylhexene, polyheptene, polycyclohexylpentene, polystyrene, poly(α-methylstyrene), poly(1,4-butadiene), poly(1,2-butadiene), polyisoprene, and polycyclooctadiene.

These addition polymers may be used singly or as a mixture of two or more.

Among these, polybutene, polypentene, polymethylpentene, polyhexene, polymethylhexene, polybutadiene and polyisoprene are preferred, and polymethylpentene is especially preferred. These preferred polymers have a relatively high gas permeability and pressure resistance and do not soften at room temperature.

One or a plurality of ultrathin solid membranes of the addition polymer are used. Preferably, one or a plurality of such ultrathin solid membranes, adjusted to a total thickness of about 50 Å to about 5000 Å, preferably about 50 Å to about 3000 Å, are laminated to the porous sheet-like material.

The porous sheet-like material makes up for the weak self-supporting ability of the solid membrane of this invention, and scarcely affects the gas separating ability of the solid membrane of this invention.

The porous sheet-like material may be any of sheet-like materials having a number of small pores, smoothness and self-supporting property, such as Japanese paper, nonwoven cloths, synthetic paper-like sheets, filter papers, cloths, wire nets, filtration membranes, ultrafiltration membranes, and porous films. Preferred porous sheet-like materials include porous polyethylene films (e.g., Celpore, a trademark for a product of Sekisui Chemical Co., Ltd.). porous polypropylene films (e.g., Celgard, a trademark for a product of Celanese Corporation), cellulosic ultrafiltration membranes (e.g., Fuji-Microfilter, a trademark for a product of Fuji Film Co., Ltd.), porous polycarbonate films (e.g., Nuclepore, a trademark for a product of Nomura Microscience Co., Ltd.), and polysulfone-type ultrafiltration membranes (e.g., Toyo-ultrafilter, a trademark for a product of Toyo Filter Paper Co., Ltd.). The porous polypropylene films are especially preferred because of their good adhesion to the solid membrane of this invention.

The porous sheet-like material having supported thereon the solid membrane of this invention (which is sometimes referred to hereinbelow as a "composite film") can be used as prepared by the process described above for the separation of gases. Alternatively, before use in such an application, the composite film may be heat-treated under temperature and time conditions which do not cause melting of the solid membrane (for example, in the case of heating in an atmosphere, heating is carried out at a temperature of 60° to 300° C., preferably 80° to 200° C., for a period of 3 seconds to 50 hours, preferably 5 seconds to 20 hours) to improve adhesion between the solid membrane and the porous sheet-like material.

The solid membrane of this invention is used to obtain a gas having a specified component gas concentrated therein from a mixture of two or more gases, as stated hereinabove. For example, it is used in the production of oxygen-enriched air from atmospheric air, the production of $H_2$-enriched gas from a gaseous mixture containing $H_2$ and CO, the removal of $H_2O$ from a gaseous mixture containing $H_2O$, the removal of $SO_2$ and/or nitrogen oxide gases $NO_x$, from a gaseous mixture containing $SO_2$ and/or $NO_x$ and the production of a He-enriched gas from a gaseous mixture containing He. It is preferably used in the production of oxygen-enriched air (with an oxygen content of, for example about 30 to about 45%) from the atmospheric air.

In obtaining a concentrated gas by using the solid membrane of this invention, it is only necessary to provide a difference between the partial pressures of a gas to be concentrated on the two surfaces of the solid membrane. And as the ratio (high pressure/low pressure) between the partial pressures of the gas increases, there is obtained a gas in which the gas to be concentrated is more enriched. For example, in the production of oxygen-enriched air from the atmospheric air, the pressure of the atmospheric air fed to one surface of the solid membrane is increased to more than the atmospheric pressure and the pressure of the other surface is maintained at atmospheric pressure or reduced pressure. Or the pressure of the atmospheric air to be supplied to one surface is maintained at atmospheric pressure and the pressure of the other surface is reduced.

In order to obtain a gas having a specified gas concentrated therein from a gaseous mixture of two or more gases, it is convenient to use a module constructed by using the composite film in accordance with this invention. The present invention provides such a module.

The following Examples illustrate the present invention more specifically. All parts in these examples are by weight.

EXAMPLE 1

Cyclohexenyl hydroxyperoxide (4.75 parts) was dissolved in 90.25 parts of cyclohexene, and 5.0 parts of poly(4-methylpentene-1) (TPX DX-810, a trademark for a product of Mitsui Petrochemical Industries, Ltd.) to prepare a solvent solution.

The solvent solution was maintained at 25° C., and one drop of the solvent solution was dropped onto the surface of stationary water at 10° C. (liquid support) from an opening having an area of about 2 mm$^2$ and spaced about 3 mm above the water surface.

Immediately then, the droplet of the solvent solution spread on the water surface to give a substantially circular solid membrane having its center nearly at the site of dropping. This operation was repeated a number of times to give circular solid membranes. The average membrane area of the resulting solid membranes was 567 cm$^2$.

Two solid membranes so formed on the water surface were supported on the same surface of a porous polypropylene film from below the water surface, and were withdrawn from the water (the two solid membranes were in the superimposed state) to obtain a composite film.

The composite film had an oxygen permeation velocity of $2.51 \times 10^{-4}$ cc (STP)/cm$^2$·sec·cmHg. The ratio of the oxygen velocity coefficient to nitrogen permeation velocity (to be referred to as selectivity) of the composite film was 3.5.

The surface tension ($c_1$) of water, the surface tension ($a_1$) of the solvent solution and the interfacial tension ($b_1$) between the water and the solvent solution, which were all measured at 25° C., were 72.0, 17.8, and 8.2 dynes/cm, respectively. The $[c_1-(a_1+b_1)]$ value determined from these measured values (to be referred to as the spreading factor) was 46.0 dynes/cm.

The distribution coefficient of the cyclohexyl hydroxyperoxide (the concentration in cyclohexene/the concentration in water) was 2.6.

These results are summarized in Table 1.

It was ascertained that cyclohexenyl hydroperoxide was not present in the resulting composite film.

The thickness of one membrane was calculated to be 0.08 micron on an average. (One drop weighed 0.075 g on an average, and the amount of the polymer in the liquid droplet was $3.75 \times 10^{-3}$ g, and the specific gravity of the polymer was 0.830.)

EXAMPLES 2 AND 8

Example 1 was repeated except that cyclohexylamine, aniline, α-naphthol, phenol, benzoic acid, cyclohexanone or furfural was used instead of cyclohexenyl hydroxyperoxide. The results are shown in Table 1.

EXAMPLES 9 TO 11

Example 1 was repeated except that poly(4-methylpentene-1) TPX MX-001, TPX MX-002 or TPX MX-004 (the products of Mitsui Petrochemical Industries, Ltd.) was used instead of the poly(4-methylpentene-1) TPX DX-810. The results are shown in Table 1.

EXAMPLE 12

Example 1 was repeated except that a solvent solution obtained by dissolving 5.0 parts of poly[4-methylpentene-1(70)-decene-1 (30)] copolymer (charge ratio 70 moles of 4-methylpentene and 30 moles of decene-1) in a solution of 4.75 parts of cyclohexenone in 90.25 parts of cyclohexene was used instead of the solvent solution used in Example 1. The results are shown in Table 1.

EXAMPLES 13 TO 15

Example 1 was repeated except that a solvent solution obtained by dissolving 5.0 parts of poly(1,2-butadiene), poly(1-butene) or poly(1,4-butadiene) in a solution of 4.75 parts of cyclohexenyl hydroxyperoxide in 90.25 parts of cyclohexene was used instead of the solvent solution used in Example 1. The results are shown in Table 1.

EXAMPLE 16

Example 1 was repeated except that a solvent solution obtained by dissolving 3 parts of polyisoprene in a solution of 3 parts of cyclohexanol in 94 parts of cyclohexene was used instead of the solvent solution used in Example 1. The results are shown in Table 1.

COMPARATIVE EXAMPLE 1

Example 1 was repeated except that a solvent solution consisting of 5.0 parts of poly(4-methylpentene-1) (TPX DX-810) dissolved in 95 parts of cyclohexene was used instead of the solvent solution used in Example 1. The results are shown in Table 1.

It is seen from Table 1 that in this example, the spreading factor was only 16.7 dynes/cm. For this reason, spreading of the liquid droplet on the water surface was poor (average membrane area 202 cm$^2$), and the resulting solid membrane has numerous pores.

COMPARATIVE EXAMPLES 2 AND 3

Example 1 was repeated except that n-octanol of ethanol was used instead of the cyclohexyl hydroxyperoxide used in Example 1.

The results are shown in Table 1.

It is seen from Table 1 that in these Comparative Examples, the spreading factor was within the range of this invention, but the distribution coefficient between cyclohexene and water fell outside the range of this invention. The distribution coefficient was 39.1 for n-octanol, but was nearly 0 for ethanol. This is presumably because the n-octanol has low solubility in water and therefore remains in the membrane even when the cyclohexene solvent has evaporated off, and since the n-octanol has no solubilizing power for poly(4-methylpentene-1), the polymer precipitates and fails to form a membrane. In the case of ethanol, it is presumed that since its solubility in water is high, it dissolves in water immediately after dropping, and it is the same as in the case of using no additive. The membrane obtained by addition of ethanol is much the same in appearance as the membrane obtained by using cyclohexene alone.

TABLE 1

| Example | Addition polymer | Other compound in the solvent Name | Distribution Coefficient (Cyclohexene/water) |
|---|---|---|---|
| 1 | Poly(4-methylpentene-1) (DX-810) | Cyclohexenyl hydroxyperoxide | 2.6 |
| 2 | Poly(4-methylpentene-1) (DX-810) | Cyclohexylamine | 3.8 |
| 3 | Poly(4-methylpentene-1) (DX-810) | Aniline | 2.3 |
| 4 | Poly(4-methylpentene-1) (DX-810) | α-Naphthol | 10.1 |
| 5 | Poly(4-methylpentene-1) (DX-810) | Phenol | 2.3 |
| 6 | Poly(4-methylpentene-1) (DX-810) | Benzoic acid | 6.4 |
| 7 | Poly(4-methylpentene-1) (DX-810) | Cyclohexanone | 1.6 |
| 8 | Poly(4-methylpentene-1) (DX-810) | Furfural | 0.6 |
| 9 | Poly(4-methylpentene-1) (MX-001) | Cyclohexenyl hydroxyperoxide | 2.6 |
| 10 | Poly(4-methylpentene-1) (MX-002) | Cyclohexenyl hydroxyperoxide | 2.6 |
| 11 | Poly(4-methylpentene-1) (MX-004) | Cyclohexenyl hydroxyperoxide | 2.6 |
| 12 | Poly[4-methylpentene(70)-decene-1(30)] copolymer | Cyclohexenone | 1.8 |
| 13 | Poly(1,2-butadiene) | Cyclohexenyl hydroxyperoxide | 2.6 |
| 14 | Poly(1-butene) | Cyclohexenyl hydroxyperoxide | 2.6 |
| 15 | Poly(1,4-butadiene) | Cyclohexenyl hydroxyperoxide | 2.6 |
| 16 | Polyisoprene | Cyclohexanol | 2.2 |
| Comp. Ex. 1 | Poly(4-methylpentene-1) (DX-810) | None | — |
| Comp. Ex. 2 | Poly(4-methylpentene-1) (DX-810) | Octanol | 39.1 |
| Comp. Ex. 3 | Poly(4-methylpentene-1) (DX-810) | Ethanol | — |

| Example | Surface tension of the solvent solution | Interfacial tension between the solvent solution and water | Spreading factor $[c_1 - (a_1 + b_1)]$ |
|---|---|---|---|
| 1 | 17.8 | 8.2 | 46.0 |
| 2 | 21.8 | 7.0 | 43.2 |
| 3 | 18.9 | 6.5 | 46.8 |
| 4 | 18.9 | 13.7 | 39.4 |
| 5 | 21.9 | 16.7 | 33.4 |
| 6 | 22.0 | 15.2 | 34.8 |
| 7 | 19.5 | 18.0 | 34.5 |
| 8 | 16.0 | 19.5 | 36.5 |
| 9 | 18.0 | 7.6 | 46.4 |
| 10 | 19.4 | 8.0 | 44.6 |
| 11 | 17.5 | 7.9 | 46.6 |
| 12 | 24.7 | 15.2 | 32.1 |
| 13 | 22.7 | 3.1 | 46.2 |
| 14 | 22.5 | 7.2 | 42.3 |
| 15 | 22.8 | 10.8 | 38.4 |
| 16 | 22.7 | 11.6 | 37.7 |
| Comp. Ex. 1 | 22.7 | 32.6 | 16.7 |
| Comp. Ex. 2 | 22.2 | 11.4 | 38.4 |
| Comp. Ex. 3 | 18.5 | 7.6 | 45.9 |

| Example | Average membrane area (cm²) | Oxygen permeating velocity [cc(STP)cm² · sec · cmHg] | Selectivity (O₂/N₂) |
|---|---|---|---|
| 1 | 567 | $2.51 \times 10^{-4}$ | 3.5 |
| 2 | 548 | $2.80 \times 10^{-4}$ | 3.3 |
| 3 | 324 | $3.42 \times 10^{-4}$ | 2.8 |
| 4 | 403 | $3.89 \times 10^{-4}$ | 2.8 |
| 5 | 369 | $3.27 \times 10^{-4}$ | 2.9 |
| 6 | 384 | $3.06 \times 10^{-4}$ | 3.0 |
| 7 | 333 | $2.81 \times 10^{-4}$ | 3.2 |
| 8 | 363 | $4.05 \times 10^{-4}$ | 2.7 |
| 9 | 527 | $2.29 \times 10^{-4}$ | 3.7 |
| 10 | 518 | $2.23 \times 10^{-4}$ | 3.7 |
| 11 | 590 | $2.30 \times 10^{-4}$ | 3.5 |
| 12 | 340 | $4.52 \times 10^{-4}$ | 2.3 |
| 13 | 326 | $2.58 \times 10^{-4}$ | 2.5 |
| 14 | 342 | $4.63 \times 10^{-4}$ | 2.7 |
| 15 | 414 | $3.93 \times 10^{-4}$ | 2.5 |
| 16 | 308 | $2.21 \times 10^{-4}$ | 2.3 |
| Comp. Ex. 1 | 202 | Because of numerous pores, a homogeneous membrane could not be obtained. | |
| Comp. Ex. 2 | 514 | The polymer precipitated and failed to give a membrane. | |
| Comp. Ex. 3 | 323 | Because of numerous pores, a homogeneous membrane could not be obtained. | |

EXAMPLE 17

A solution was prepared by dissolving 1.5 parts of poly(4-methylpentene-1) (TPX DX-810, a product of Mitsui Petrochemical Industries, Ltd.) in a solution of 3 parts of cyclohexenyl hydroxyperoxide in 95.5 parts of trichloroethylene.

The surface tension ($c_1$) of water, the surface tension ($a_1$) of the solvent solution, and the interfacial tension ($b_1$) between the water and the solvent solution, which were measured at 25° C., were 72.0, 21.0 and 15.4 dynes/cm, respectively. The $[c_1-(a_1+b_1)]$ value calculated from the measured values was 35.6.

The distribution coefficient of the cyclohexenyl hydroxyperoxide (the concentration in trichloroethylene/the concentration in water) was 3.1.

The solvent solution was maintained at 70° C., and one drop of it was gently added to the water surface at 30° C. The resulting solid membrane had an average membrane area of 280 cm² and a thickness of 0.064 micron.

A laminated assembly of two such solid membranes showed an oxygen permeation velocity of $2.93 \times 10^{-4}$ cc (STP)/cm²·sec·cmHg, and a selectivity of 3.3.

COMPARATIVE EXAMPLE 4

Example 17 was repeated except that a solvent solution prepared by dissolving 1.5 parts of poly(4-methylpentene-1) (TPX DX-810) in 98.5 parts of trichloroethylene was used instead of the solvent solution used in Example 17. The resulting solid membrane had an average membrane area of 50 cm$^2$. A laminated assembly of two such solid films showed an oxygen permeation velocity of $3.9 \times 10^{-3}$ cc (STP)/cm$^2$·sec·cmHg and a selectivity of 1.1.

The surface tension ($a_1$) of the solvent solution and the interfacial tension ($b_1$) between the water and the solvent solution were 24.0 and 26.2 dynes/cm, respectively. The [$c_1 - (a_1 + b_1)$] value calculated from these measured values was 21.8.

EXAMPLE 18

A solvent solution was prepared by dissolving 5 parts of poly(4-methylpentene-1) (TPX DX-810) in a solution of 95 parts of cyclohexene in 5 parts of cyclohexenone.

The solvent solution was maintained at 40° C., and one drop of it was added dropwise to the surface of water at 10° C. as a stationary liquid support from an opening with an area of about 1 mm$^2$ located about 3 mm above the water surface. The average membrane thickness was 450 cm$^2$, and the thickness of one membrane was calculated to be 0.060 micron on an average.

A composite film composed of two such solid films supported on a porous polypropylene film showed an oxygen permeation velocity of $5.5 \times 10^{-4}$ cc (STP)/cm$^2$·sec·cmHg and a selectivity of 3.3.

EXAMPLES 19 TO 26

Example 18 was repeated except that each of the additives shown in Table 2 was used instead of cyclohexenone. The area and thickness of the resulting membrane and the properties of a laminated assembly of two such solid membranes are shown in Table 2.

TABLE 2

| Example | Additive | Membrane area (cm$^2$) | Membrane thickness (microns) | Oxygen permeation velocity [cc(STP)/ cm$^2$·sec·cmHg] | Selectivity |
|---|---|---|---|---|---|
| 19 | Ethyl glycol monophenyl ether | 390 | 0.070 | $4.5 \times 10^{-4}$ | 3.1 |
| 20 | Anisyl alcohol | 420 | 0.065 | $5.0 \times 10^{-4}$ | 3.2 |
| 21 | β-phenethyl alcohol | 380 | 0.071 | $4.2 \times 10^{-4}$ | 3.1 |
| 22 | 2,6-Xylenol | 350 | 0.077 | $4.5 \times 10^{-4}$ | 3.0 |
| 23 | Isophorone | 390 | 0.070 | $4.8 \times 10^{-4}$ | 3.0 |
| 24 | Acetophenone | 300 | 0.090 | $2.2 \times 10^{-4}$ | 3.0 |
| 25 | Anisaldehyde | 360 | 0.075 | $4.6 \times 10^{-4}$ | 3.1 |
| 26 | Hydroxycitronellal | 380 | 0.071 | $4.0 \times 10^{-4}$ | 3.2 |

EXAMPLES 27 TO 33

Example 18 was repeated except that cyclohexenol was used instead of cyclohexanone and each of the addition polymers shown in Table 3 was used instead of poly(4-methylpentene-1).

The average membrane areas and thicknesses of the resulting solid membranes are shown in Table 3. Table 3 also shows, for purposes of comparison, the average membrane areas of solid membranes obtained in the same way as above except that cyclohexene alone was used as the solvent.

TABLE 3

| Example | Addition polymer | Membrane area (cm$^2$)* | Membrane thickness (microns) |
|---|---|---|---|
| 27 | Poly(hexene-1) | 550 (230) | 0.051 |
| 28 | Poly(pentene-1) | 530 (220) | 0.057 |
| 29 | Polystyrene | 620 (410) | 0.048 |
| 30 | Poly(1,4-butadiene) | 480 (140) | 0.063 |
| 31 | Poly(decene-1) | 720 (310) | 0.042 |
| 32 | Poly[4-methylpentene-1 (70)-hexene-1 (30)] copolymer** | 580 (240) | 0.060 |
| 33 | Poly[4-methylpentene-1 (80)-decene-1 (20)] copolymer** | 610 (210) | 0.096 |

*The parenthesized figures show the membrane areas for comparison.
**The figures in the smaller parentheses show the mole ratios of the charged monomers.

EXAMPLE 34

A solvent solution was prepared from 85 parts of cyclohexene, 5 parts of cyclohexenone, 5 parts of cyclohexenol and 5 parts of poly(4-methylpentene-1) (DX-810). The solvent solution was maintained at 45° C., and one drop of it was dropped onto the surface of water at 10° C. in the same way as in Example 18. In the same way as in Example 18, two solid membranes (average thickness about 0.055 micron) were supported on a porous polypropylene film (Celgard, a trademark for a product of Celanese Corporation), and the resulting composite film was placed on a glass plate and heat-treated for 4 hours at each of the temperatures shown in Table 4.

The properties of the composite film are also shown in Table 4.

A weight (1 g) was placed gently on the solid membrane surface of the heat-treated composite film, and then pulled up. The oxygen permeation properties of the area on which the weight had been placed were determined. The results are also shown in Table 4.

TABLE 4

| Run No. | Heat-treatment temperature (°C.) | Permeating properties after heat-treatment | | Permeating properties after placing the weight | |
|---|---|---|---|---|---|
| | | Oxygen permeating velocity, [cc(STP)/cm·sec·cmHg] | Selectivity | Oxygen permeating velocity [cc(STP/cm·sec·cmHg] | Selectivity |
| 1 | None | $6.9 \times 10^{-4}$ | 3.0 | $>1 \times 10^{-2}$ | 1.0 |
| 2 | 20 | $6.8 \times 10^{-4}$ | 2.9 | $>1 \times 10^{-2}$ | 1.0 |
| 3 | 40 | $6.0 \times 10^{-4}$ | 3.0 | $>1 \times 10^{-2}$ | 1.0 |
| 4 | 60 | $3.7 \times 10^{-4}$ | 3.1 | $3.9 \times 10^{-4}$ | 3.0 |
| 5 | 80 | $3.1 \times 10^{-4}$ | 3.4 | $3.1 \times 10^{-4}$ | 3.4 |
| 6 | 100 | $2.7 \times 10^{-4}$ | 3.4 | $2.6 \times 10^{-4}$ | 3.5 |
| 7 | 120 | $3.0 \times 10^{-4}$ | 3.3 | $2.8 \times 10^{-4}$ | 3.5 |
| 8* | None | $4.5 \times 10^{-4}$ | 3.5 | $>1 \times 10^{-2}$ | 1.1 |
| 9* | 80 | $2.0 \times 10^{-4}$ | 3.9 | $2.1 \times 10^{-4}$ | 3.9 |

*In Runs Nos. 8 and 9, the addition polymer was 4-methylpentene-1 (MX-002), and the heat-treatment in Run No. 9 was performed at 80° C. for 4 hours.

The results in Table 4 demonstrate that heat-treatment under suitable conditions gives solid membranes of this invention which have resistance to rupture.

EXAMPLES 35 TO 37

Example 34 was repeated except that each of the addition polymers in Table 5 was used, and the heat-treatment was performed at 80° C. for 4 hours. The results are shown in Table 5.

TABLE 5

| Example | Polymer (membrane) thickness | Permeating properties before heat-treatment Oxygen permeating velocity [cc(STP)/cm·sec·cmHg] | Selectivity | Permeating properties after heat-treatment Oxygen permeating velocity [cc(STP)/cm 19 sec·cmHg] | Selectivity |
|---|---|---|---|---|---|
| 35 | Polystyrene (0.13 micron) | $3.6 \times 10^{-5}$ | 1.7 | $2.7 \times 10^{-5}$ | 1.9 |
| 36 | Poly(1,4-butadiene) (0.09 micron) | $7.0 \times 10^{-4}$ | 2.6 | $3.1 \times 10^{-4}$ | 3.0 |
| 37 | Poly(4-methylhexene) (0.06 micron) | $6.1 \times 10^{-4}$ | 3.1 | $2.9 \times 10^{-4}$ | 3.3 |

EXAMPLES 38 TO 44

In each run, a solvent solution was prepared by dissolving 5 parts (5.26 parts in Examples 41 to 44) of each of the addition polymers shown in Table 6 in 100 parts of a solvent composed of cyclohexane and cyclohexenyl hydroxyperoxide. The solvent solution was maintained at 40° C., and one drop of it was dropped onto the surface of water at 10° C. in the same way as in Example 1.

Two solid membranes obtained were supported on a porous polypropylene film in the same way as in Example 1, and the resulting composite film was then heat-treated at 90° C. for 4 hours. The properties of the composite film are also shown in Table 6.

TABLE 6

| Example | Content of cyclohexenyl hydroperoxide in the solvent (wt. %) | Polymer | Average membrane area (cm²) | Oxygen permeating velocity [cc(STP)/cm²·sec·cmHg] | Selectivity |
|---|---|---|---|---|---|
| 38 | 4.7 | Poly(4-methylpentene-1) (DX-810) | 552 | $1.41 \times 10^{-4}$ | 3.28 |
| 39 | 12.2 | Poly(4-methylpentene-1) (DX-810) | 591 | $1.68 \times 10^{-4}$ | 3.05 |
| 40 | 3.0 | Poly(4-methylpentene-1) (DX-810) | 450 | $1.62 \times 10^{-4}$ | 3.12 |
| 41 | 3.0 | Poly(4-methylpentene-1) (MX-001) | 550 | $1.21 \times 10^{-4}$ | 4.03 |
| 42 | 3.0 | Poly(4-methylpentene-1) (MX-002) | 548 | $1.20 \times 10^{-4}$ | 4.14 |
| 43 | 3.0 | Poly(4-metnyl-pentene-1) (MX-004) | 548 | $1.20 \times 10^{-4}$ | 3.97 |
| 44 | 3.0 | Poly(1,2-butadiene) | 470 | $1.55 \times 10^{-5}$ | 2.98 |

EXAMPLES 45 TO 53

(1) 600 Parts of cyclohexane distilled at atmospheric pressure was oxidized with oxygen or air under the various conditions shown in Table 7, and a solvent containing cyclohexenyl hydroxyperoxide was produced. The refractive index, measured by the Abbe's refractometer, of the resulting solvent is also shown in Table 7. The solvent of Run No. 5 in Table 7 was obtained by diluting the solvent of Run No. 3 to 2.5 times its volume with cyclohexane.

TABLE 7

| Run No. | Molecular oxygen | Reaction temperature (°C.) | Reaction (hours) | Stirring | Refractive index of the solvent ($n_\alpha^{15}$) |
|---|---|---|---|---|---|
| 1 | Oxygen | 50 | 33 | Yes | 1.4500 |
| 2 | Oxygen | 83 | 61 | Yes | 1.4538 |
| 3 | Oxygen | 50 | 47 | Yes | 1.4527 |
| 4 | Air | 30 | 72 | No | 1.4494 |
| 5 | — | — | — | — | 1.4500 |
| 6 | Air | 30 | 72 | No | 1.4494 |

(2) Five parts of each of the addition polymers shown in Table 8 was dissolved in 95 parts of the solvent obtained as in (1), and a solid membrane was prepared in the same way as in Example 38 using the solvent solution.

The properties of the resulting composite film (having two solid membranes supported on a porous support; heat treated at 90° C. for 4 hours) are also shown in Table 8.

TABLE 8

| Example | Solvent (Run No.) | Addition polymer | Average membrane area (cm²) | Properties of the membrane | N₂ permeating velocity [cc(STP)/cm²·sec·cmHg] | O₂ permeating velocity [cc(STP)/cm²·sec·cmHg] | Selectivity |
|---|---|---|---|---|---|---|---|
| 45 | 1 | Poly(4-methylpentene-1) (DX-810) | 552 | tough and homogeneous | $0.46 \times 10^{-4}$ | $1.51 \times 10^{-4}$ | 3.28 |
| 46 | 2 | Poly(4-methylpentene-1) (DX-810) | 620 | cloudy at the surface | $0.95 \times 10^{-4}$ | $2.10 \times 10^{-4}$ | 2.21 |
| 47 | 3 | Poly(4-methylpentene-1) | 591 | relatively tough and | $0.55 \times 10^{-4}$ | $1.68 \times 10^{-4}$ | 3.05 |

TABLE 8-continued

| Example | Solvent (Run No.) | Addition polymer | Average membrane area (cm$^2$) | Properties of the membrane | N$_2$ permeating velocity [cc(STP)/cm$^2$ · sec · cmHg] | O$_2$ permeating velocity [cc(STP)/cm$^2$ · sec · cmHg] | Selectivity |
|---|---|---|---|---|---|---|---|
| 48 | 4 | Poly(4-methyl-pentene-1) (DX-810) | 450 | homogeneous tough and homogeneous | 0.52 × 10$^{-4}$ | 1.62 × 10$^{-4}$ | 3.12 |
| 49 | 5 | Poly(4-methyl-pentene-1) (DX-810) | 544 | tough and strong | 0.44 × 10$^{-4}$ | 1.48 × 10$^{-4}$ | 3.36 |
| 50 | 6 | Poly(4-methyl-pentene-1) (DX-810) | 550 | tenacious and homogeneous | 0.30 × 10$^{-4}$ | 1.21 × 10$^{-4}$ | 4.03 |
| 51 | 6 | Poly(4-methyl-pentene-1) (MX-001) | 548 | tenacious and homogeneous | 0.29 × 10$^{-4}$ | 1.20 × 10$^{-4}$ | 4.14 |
| 52 | 6 | Poly(4-methyl-pentene-1) (MX-002) | 548 | tenacious and homogeneous | 0.30 × 10$^{-4}$ | 1.20 × 10$^{-4}$ | 3.97 |
| 53 | 5 | Poly(4-methyl-pentene-1) (MX-004) Poly(1,2-butadiene (RB-810) | 470 | tenacious and homogeneous | 0.52 × 10$^{-5}$ | 1.55 × 10$^{-5}$ | 2.98 |

EXAMPLE 54

A solvent solution was prepared which consisted of 92 parts of cyclohexene, 3 parts of cyclohexenyl hydroxyperoxide and 5 parts of poly(4-methylpentene-1) (DX-810).

A solid membrane of this invention was continuously produced from the solvent solution by using an apparatus of the type shown in FIGS. 1 and 2 of the parent application (Ser. No. 217,582).

The solvent solution was maintained at 25° C. in reservoir 20, and continuously fed at a rate of 61 cc/hr to the water surface 14 from feed port 21 in contact with the water surface. Water 15 in tank 10 was maintained at 5° C. Water was fed through water supplying pipe 24, overflowed beyond dam 29, and was discharged from water discharge port 32.

A porous polypropylene film 12 having a thickness of 25 microns and a width of 30 cm was fed from feed roller 30 into the water via rotary shaft 27 at a rate of 2 meters/min., and then withdrawn via guide roller 31.

Thus, a solid membrane 13 of the invention supported on the porous polypropylene film was continuously produced. The average membrane thickness of the solid membrane was 0.075 micron, and the composite film had an oxygen permeating velocity of 8.3×10$^{-4}$ cc (STP)/cm.sec.cmHg and a selectivity of 2.6.

COMPARATIVE EXAMPLES 5 AND 6

Example 54 was repeated except that the position of the feed opening 21 was raised to a point 10 mm above the water surface (Comparative Example 5), or it was submerged in the water to a depth of 10 mm from the water surface (Comparative Example 6).

The results are shown in Table 9 together with the data of Example 54.

TABLE 9

| Run | Position of the feed opening | State of membrane formation | Selectivity (n = 3) |
|---|---|---|---|
| Comparative Example 5 | 10 mm above water surface | Wavy. The membrane width occasionally reached 10 to 20 cm and was not stable | 1.0<br>1.0<br>1.3 |
| Comparative Example 6 | 10 mm below water surface | Wavy. The membrane width occasionally reached about 15 to 20 cm and was not stable | 1.0<br>1.2<br>1.2 |
| Example 54 | Contacting water surface | A stable membrane having a uniform width of more than 35–40 cm was formed | 2.5<br>2.7<br>2.6 |

EXAMPLE 55

In order to support two solid membranes on a porous membrane using the apparatus shown in FIGS. 1 and 2, of the parent application, a loop (length 2 m) of the porous film (thickness 25 microns, width 30 cm) was set between guide roller 31 and rotatable shaft 27, and the loop was rotated between the roller and the shaft. Otherwise, the same conditions as in Example 54 were used, and a laminated assembly of two solid films supported on the porous membrane was produced.

An about 1.8 m length was taken from the resulting composite film excepting the joint portion, and at any 10 sites in the longitudinal and widthwise directions, a membrane sample having a size of 10 cm×10 cm was cut out, and the oxygen permeating properties of the cut samples were measured. It was found that the oxygen permeating velocities of the samples were 1.3 to 1.7×10$^{-4}$ cc (STP)/cm$^2$.sec.cmHg and their selectivities were 3.8 to 4.0, showing little variations. The selectivity of the composite film was better than in the case of the batchwise operation in which one drop of the solvent solution was dropped onto the liquid support.

The membrane thickness was determined to be 0.12 to 0.15 micron by calculating the weight loss of the solid membrane not carried on the porous film after wiping it off.

EXAMPLE 56

In the apparatus shown in FIGS. 1 and 2 of the parent application, a heat-treating column having a length of 1 meter was provided between rotatable shaft 27 and guide roller 31.

Using the resulting apparatus, Example 54 was repeated except that the temperature of the heat-treating column was set at 165° C.

The solid membrane supported on the porous film could be wound up on a drum having a diameter of 10 cm.

EXAMPLES 57 TO 59

Example 55 was repeated except that each of the various addition polymers shown in Table 10 was used instead of the poly(4-methylpentene-1) used in Example 55. The results are shown in Table 10.

TABLE 10

| Example | Addition polymer | Selectivity |
| --- | --- | --- |
| 57 | Poly(4-methylpentene-1) (MX002) | 4.1 |
| 58 | Poly(hexene-1) | 3.2 |
| 59 | Poly(1,4-butadiene) | 2.9 |

EXAMPLE 60

(1) On both surfaces of an aluminum plate having a size of 250 mm×500 mm×1 mm (thickness) were laminated a polypropylene net (thickness 500 microns, mesh opening size 14 mesh) and a polyethylene terephthalate nonwoven fabric (thickness 230 microns, basis weight 180 g/m$^2$) having nearly the same size as the aluminum plate, in this order, to form a basic member.

FIG. 2 of the accompanying drawings show a schematic perspective view illustrating the structure of this member.

A cut 42 having a width of 6 mm and a length of 40 mm was provided in one 250 mm-long side of the aluminum plate 41. To the cut 42 was fixed a drawing tube 44 for giving a gas drawing port 43 for drawing off a concentrated gas.

The drawing pipe 44 was built by providing a cylindrical metallic tube having a thickness of 0.3 mm, an outside diameter of 3.3 mm and a length of 75 mm, and collapsing a 50 mm-long portion of the tube from one end thereof until that portion had a thickness of 1.2 mm (the collapsed portion had a width of 4.5 mm). The collapsed portion was inserted into the cut 42 of the aluminum plate 41 as shown in FIG. 2, and an epoxy resin was filled in the space formed between the aluminum plate and the drawing tube to fix the drawing tube to the aluminum plate. At this time, the end 45 of the collapsed portion of the drawing tube 44 was positioned so that it formed a clearance of more than about 5 mm from the deepest part of the cut. By employing this construction, a gas concentrated by the solid membrane is collected by the drawing tube from the end 45 through this clearance, and is drawn off from the drawing port 43.

The net 46, the nonwoven fabric 47 and the solid membrane 48 of this invention were laminated as shown in FIG. 2 to both surfaces of the aluminum plate 41 having the drawing tube 44 fixed thereto. The aluminum plate, the net, the nonwoven fabric and solid membrane were fixed at their peripheral edge portion by an adhesive applied in a width of 15 mm so as to prevent air leakage from the peripheral edge.

The basic member for gas concentration showed a pressure drop of less than 0.6 mmHg per cm.

The solid membrane used was a composite film composed of two very thin poly(4-methylpentene-1) membranes (total average thickness 0.15 micron; selectivity=3.8) supported on a porous polypropylene film (thickness 25 microns, maximum pore diameter 0.2 micron) which was produced continuously by the process of this invention. In lamination, the porous sheet side of the composite film was contacted with the nonwoven fabric.

(2) Fourteen members produced as in (1) above were aligned by using rubber spacers having a thickness of 3 mm and a width of 10 mm between the members at both edges of the longer sides so that the drawing ports 43 were positioned in the same direction. A separately built member consisting of an aluminum plate and laminated to one surface thereof, the aforesaid net, nonwoven fabric and solid membrane (i.e., the other side was an aluminum surface) was superimposed on each of the outermost members of the resulting array of the 14 members so that the aluminum plate surface faced outwardly.

Drawing ports from the individual members of the array were connected to one assembling tube, and the entire structure was placed in a box.

FIG. 1 of the accompanying drawings shows a schematic perspective view of the module of this invention in which the array 51 was placed in the box 50. In FIG. 1, the reference numeral 52 represents the assembling tube connected to the first drawing ports 44 of the individual members, and the reference numeral 53 represents a second drawing port. The reference numeral 54 represents a common feed port for feeding a gas to be concentrated to the members, and 55, a third common drawing port for drawing the remaining gas formed as a result of concentration. The arrow shows the flow of the gas.

A gas fed from the common feed port in the direction of arrow (a) passed through the individual members of the array 51, and was withdrawn as the remaining gas from the third common drawing port 55. In other words, the fed gas was concentrated during passage through the members, and the concentrated gas was collected by the assembling tube 52 through the first drawing ports 44, and drawn off from the second common drawing port 53.

Oxygen-enriched air was produced from the air using the module constructed as above. The second common drawing port 53 was connected to a vacuum pump (not shown), and while reducing the pressure, air was fed from the common feed opening port 54 at a rate of 0.3 m$^3$/min. Oxygen-enriched air having an oxygen content of 41.7% by volume was obtained at a rate of 7 liters/min. from the vacuum pump.

COMPARATIVE EXAMPLE 7

Members consisting of the aluminum plate, the polyethylene terephthalate nonwoven fabric and the composite film having an ultrathin membrane of poly(4-methylpentene-1) supported on the porous polypropylene membrane were produced in the same way as in Example 60 except that the polypropylene net was not used.

The members showed a pressure drop of 9.4 mmHg per cm. A module was built in the same way as in Example 60 using these members. Air was separated by using the module. When the module was operated while maintaining the pressure of the assembling tube 52 at 190 mmHg ab., oxygen-enriched air having an oxygen content of 26.7% by volume was obtained at a rate of 2.9 liters/min.

COMPARATIVE EXAMPLE 8

When in the module of Example 60, air was fed from the third common drawing port 55 at the same feed rate as in Example 60 and the remaining air was drawn off from the feed port 54, oxygen-enriched air having an oxygen content of 41.2% by volume was obtained at a rate of 7 liters/min. when the pressure in the assembling tube 52 was 160 mmHg.

When the amount of air fed was changed to 70 liters/min., oxygen-enriched air having an oxygen content of 40.9% by volume was obtained by the method of Example 60, and oxygen-enriched air having an oxygen content of 40.2% by volume was obtained by the method of the present Comparative Example. Furthermore, when the amount of air fed was further decreased to 35 liters/min. an oxygen content of 39.6% by volume was achieved by the method of Example 60, but an oxygen content of only 38.6% by volume was achieved by the method of this Comparative Example.

EXAMPLE 61

An oxygen enricher was built by incorporating the module shown in Example 60 (see FIGS. 2 and 1).

Figure 3:
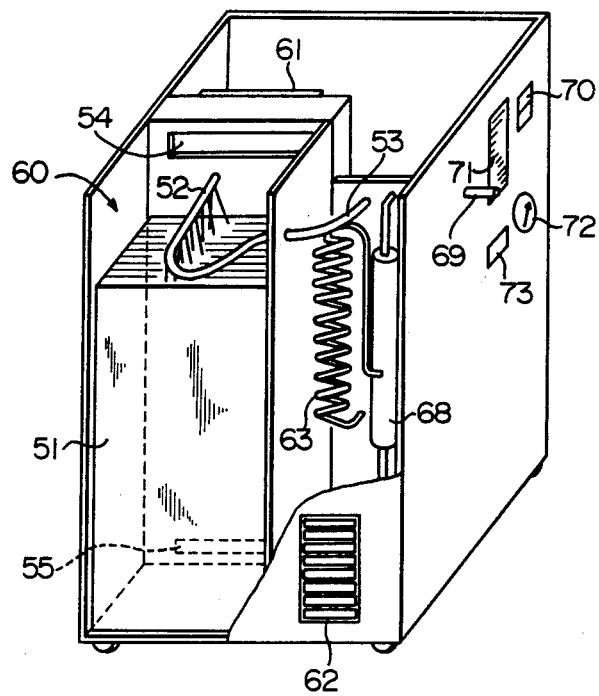
FIGS. 3 and 4 are schematic perspective views of the oxygen enricher of this invention.
Figure 4:
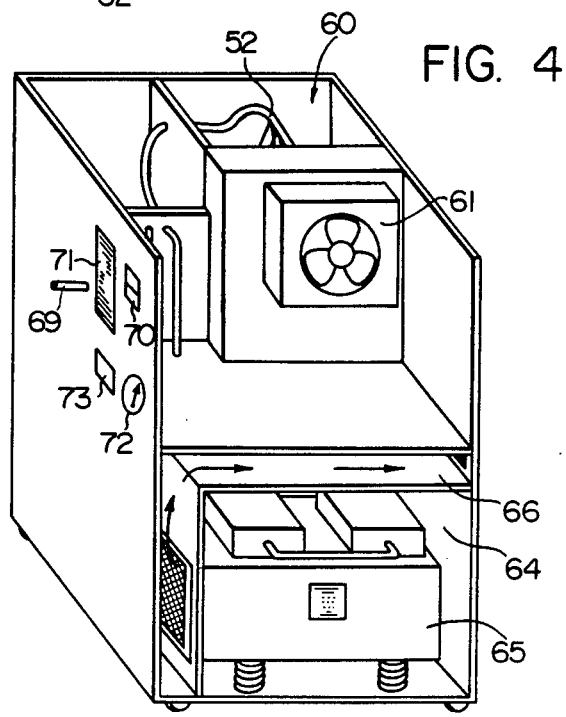

FIGS. 3 and 4 are schematic perspective views of the oxygen enricher of this invention. In these figures, the top and that side surface which appears in front on the sheet surface of these drawings are removed, FIG. 4 shows the same oxygen enricher as in FIG. 3 except that the rear side and the front side in FIG. 4 are reversed.

In FIGS. 3 and 4, the reference numeral 51 represents an array of a plurality of laminated members including the solid membranes of this invention, and 52, an assembling tube connected to the oxygen-enriched air drawing ports of the individual members. The reference numeral 60 represents a module section having the array 51 therein with an air feed port 54 and a discharge port 55 for the remaining gas.

The atmospheric air taken into the oxygen enricher from the air take-in port 62 by the rotation of fan 61 rose in contact with a cooler 63 through which the oxygen-enriched air was passed, and went past the fan 61. Then, it was introduced into the module from air feed port 54 of the module 60 and passed through the array 51. Then, it left the module from the exhaust port 55 of the module (see FIG. 3). Then, it entered a pump chamber 64 to cool a pump 65, and without heat exchange with oxygen-enriched air, was discharged out of the oxygen enricher via a discharge path. The discharge path 66 was independent so that it was kept from contact with electrical instruments (not shown FIG. 4).

On the other hand, by reducing the pressure of the inside of the individual members of the array 51 by a vacuum pump 65, oxygen-enriched air formed within the individual members was gathered by assembling tube 52, and via the vacuum pump 65, was cooled by flowing through cooling tube 63. Then, water was separated from the oxygen-enriched air by water separator 68, and as desired passed through an activated carbon layer or bacteria filter. Finally, the oxygen enriched air was taken out of the oxygen enricher from a drawing port 69.

The reference numerals 70, 71, 72 and 73 respectively represent a switch button for electric power, a flow meter, a pressure gauge and a timer.

The oxygen enricher had a width of 330 mm, a length of 380 mm, a height of 700 mm (the side having the air drawing port 69 was regarded as the front surface), and a weight of 40 kg. When this oxygen enricher was operated indoors at 15.0° C., oxygen-enriched air having an oxygen concentration of 41.7% was obtained at a rate of 7 liters/min. The temperature of oxygen-enriched air at an absolute pressure of 160 mmHg was 15.4° C. which was nearly the same as the temperature of the room. The noise during the operation was 43 horn at a place 1 meter away from the oxygen enricher.

For comparison, an oxygen enricher was built by using the module obtained in Comparative Example 5 which did not contain a polypropylene net. When this oxygen enricher was operated indoors at 15.0° C., oxygen enriched air having an oxygen concentration of 26.7% was obtained at a rate of 2.9 liters/min.

What we claim is:

1. A module comprising a plurality of members for obtaining a gas having a specific gas concentrated therein from a mixture of at least two gases, each of said members comprising (a) a solid support plate; (b) a composite film comprised of a porous sheet-like material and one or a plurality of ultrathin solid selectively permeable membranes supported on the porous sheet-like material with a thickness of about 50 to about 5000 Å, said ultrathin solid membranes being an addition polymer derived from at least one monomer selected from the group consisting of ethylenically unsaturated hydrocarbon monomers and conjugated unsaturated hydrocarbon monomers, and said composite film being laminated to both surfaces of the solid support plate so that the porous sheet-like material of the composite film faces the solid support plate; and (c) a spacer between the porous sheet-like material and the solid support plate for forming a sufficient passage for the flowing of the gas having a specified gas concentrated therein through the solid membrane; wherein (1) each of said members has a first gas drawing port for drawing off the gas having a specified gas concentrated therein, and the pressure drop in a passage for the concentrated gas inside the members is not more than about 2 mmHg per cm in a direction away from the first gas drawing port, (2) the module has a common feed port for feeding the mixture of at least two gases to an inlet chamber, a second drawing port manifolded to the first gas drawing port of each of said members, and a third common drawing port for drawing off from the inlet chamber the remaining gases formed as a result of concentration by each of the members, and (3) the flow passage of the concentrated gas in each of the members is disposed in the direction from the common feed port to the third common drawing port in the inlet chamber so that the flow of the gaseous mixture in the inlet chamber is countercurrent, or angularly displaced, to the flowing direction of the concentrated gas in each of the flow paths of the members.

2. The module of claim 1 wherein the common feed port for feeding the gaseous mixture and the third common drawing port are present on the same side surface of the module or on different side surfaces not adjoining each other.

3. The module of claim 1 which is for obtaining an oxygen-enriched gas from air.

4. An oxygen enricher for obtaining an oxygen-enriched gas from air comprising a module including a plurality of members for obtaining the oxygen-enriched gas from the air, an air take-in port for feeding the air into the module, an air exhaust port for drawing a gas of a reduced oxygen concentration from the module, a vacuum pump for reducing the pressure of the passage for the oxygen-enriched gas in the members and drawing the oxygen-enriched gas, a cooling and water-removing means for lowering the temperature of the oxygen-enriched gas from the vacuum pump and removing water therefrom, and a housing; characterized in that (1) the module is the module of claim 1,
(2) a fan is provided in front of the air taken-in port of the module for feeding air into the module and drawing off a gas having a reduced oxygen concentration from the module,
(3) said vacuum pump is adapted to be cooled by the gas having a reduced oxygen concentration which has left the module, and
(4) a passage is provided through which the oxygen-enriched gas from the vacuum pump flows while it is cooled fully by the cooling and water-removing means cooled by the air taken into the oxygen enricher from the air taken-in port and the cooled oxygen-enriched gas is then drawn out of the oxygen enricher without heat exchange with the gas having a reduced oxygen concentration which has cooled the vacuum pump.

5. The oxygen enricher of claim 4 wherein in the module the common feed port for feeding the gaseous mixture and the third common drawing port are present on the same side surface of the module or on different side surfaces not adjoining each other.

6. The oxygen enricher of claim 5 wherein the gas having a reduced oxygen concentration which has left the module, after cooling the vacuum pump, is discharged out of the oxygen enricher through a winding path within the housing.

7. The oxygen enricher of claim 4 wherein the gas having a reduced oxygen concentration which has left the module, after cooling the vacuum pump, is discharged out of the oxygen enricher through a winding path within the housing.

* * * * *